(12) United States Patent
Anderson et al.

(10) Patent No.: US 6,318,710 B1
(45) Date of Patent: Nov. 20, 2001

(54) STABILIZER BARS WITH VARIABLE CROSS-SECTIONAL PROPERTIES

(75) Inventors: Gerald D. Anderson, Oxford, MI (US); Michael W. Mattice, Cambridge (CA); John M. Khoury, Warren, MI (US); Thomas M. Drouillard, Wallaceburg (CA); Kermit G. Rowe, III, Pembroke, KY (US); David I. Fretwell, Whiston; Alistair Bruce Christian Lovatt, Sheffield, both of (GB)

(73) Assignee: Meritor Suspension Systems Company, Troy, MI (US)

( * ) Notice: Subject to any disclaimer, the term of this patent is extended or adjusted under 35 U.S.C. 154(b) by 0 days.

(21) Appl. No.: 09/716,797

(22) Filed: Nov. 21, 2000

(51) Int. Cl.[7] .......................... B60G 21/055; C23C 8/22; F16F 1/14
(52) U.S. Cl. .......................... 267/273; 267/188; 267/154
(58) Field of Search .................................. 267/154, 273, 267/278, 279, 188; 280/124.166, 124.167; 29/527.1, 527.2

(56) References Cited

U.S. PATENT DOCUMENTS

| | | |
|---|---|---|
| 2,333,650 | 11/1943 | Hickman . |
| 2,706,627 | 4/1955 | Hickman . |
| 3,029,091 | 4/1962 | Allison . |
| 3,037,789 | 6/1962 | Allison . |
| 3,844,583 * | 10/1974 | Sakow et al. .......................... 267/273 |
| 3,918,737 | 11/1975 | Hofmann et al. . |
| 4,138,141 * | 2/1979 | Andersen .............................. 280/689 |
| 4,334,693 | 6/1982 | Huber . |
| 4,378,122 * | 3/1983 | Ohno et al. ........................... 267/273 |
| 4,469,349 * | 9/1984 | Tomita et al. ........................ 267/273 |
| 4,869,480 * | 9/1989 | Beutin et al. ......................... 267/273 |
| 5,176,370 * | 1/1993 | Yamamoto ............................ 267/273 |
| 5,810,338 * | 9/1998 | Koenig et al. ........................ 267/273 |
| 5,954,353 | 9/1999 | Kincaid et al. . |
| 6,196,530 * | 3/2001 | Muhr et al. ........................... 267/273 |

* cited by examiner

Primary Examiner—Christopher P. Schwartz
(74) Attorney, Agent, or Firm—Carlson, Gaskey & Olds

(57) ABSTRACT

A stabilizer bar is provided having a varying cross-section along the length of the bar. In particular, the stabilizer bar includes a first cross-sectional area and a second cross-sectional area that is different than the first cross-sectional area. A first surface at least partially defines the second cross-sectional area. The first surface has a non-circular shape with primary and secondary load bearing directions bearing different maximum loads in each of the directions. The shape of the second cross-sectional area may be arranged so that the primary load bearing direction is generally aligned with the highest load. Similarly, the shape of the second cross-sectional area may be arranged in a manner to bear the highest torsional load. The stabilizer bar may be solid or hollow. Preferred shapes may include egg-shaped or elliptical shaped surfaces. Alternatively, the stabilizer bar may have a generally uniform cross-sectional area along its length with the non-circular shape described above.

20 Claims, 1 Drawing Sheet

STABILIZER BARS WITH VARIABLE CROSS-SECTIONAL PROPERTIES

BACKGROUND OF THE INVENTION

This invention relates to a stabilizer bar for a vehicle, and more particularly, the invention relates to a stabilizer bar having a cross-sectional shape for better enduring stresses in that particular cross-sectional area.

Stabilizer bars for vehicles are increasingly being required to withstand higher loads and stresses. Stabilizer bars are typically formed from a bar having a circular cross-section. The bar is bent into the required shape for the particular vehicle application. For higher load and stress areas, the thickness along the entire length of the bar may be increased. However, much of the stabilizer bar experiences a lower load and stress and therefore the increased bar thickness is unnecessary along much of the length of the bar. Alternatively, the thickness of the bar has been increased in the area of the higher loads and stresses. But, only a circular cross-section has been used in the thicker area of the bar. By using stabilizer bars having only circular cross-sections, unnecessary weight and costs is added to the bar. That is, a circular cross-section is not necessarily the most effective shape for enduring the loads and stresses in the particular area. Accordingly, what is needed is a stabilizer bar having a variable cross-section designed to better endure the loads and stresses in the particular area.

SUMMARY OF THE INVENTION AND ADVANTAGES

The present invention provides a stabilizer bar having a varying cross-section along the length of the bar. In particular, the stabilizer bar includes a first cross-sectional area and a second cross-sectional area that is different than the first cross-sectional area. A first surface at least partially defines the second cross-sectional area. The first surface has a non-circular shape with primary and secondary load bearing directions bearing different maximum loads in each of the directions. The shape of the second cross-sectional area may be arranged so that the primary load bearing direction is generally aligned with the highest load. Similarly, the shape of the second cross-sectional area may be arranged in a manner to bear the highest torsional load. The stabilizer bar may be solid or hollow. Preferred shapes may include egg-shaped or elliptical shaped surfaces. Alternatively, the stabilizer bar may have a generally uniform cross-sectional area along its length with the non-circular shape described above.

Accordingly, the above invention provides a stabilizer bar having a variable cross-sectional area along its length to more efficiently endure the different loads and reduce weight and costs of the stabilizer bar.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
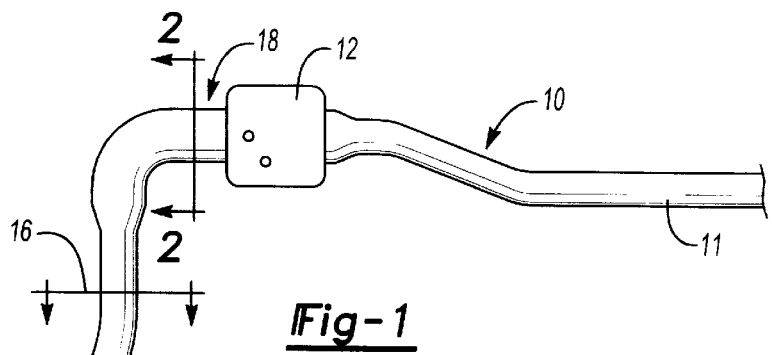
FIG. 1 is a partial elevational view of a stabilizer bar of the present invention.

A stabilizer bar 10 is shown in FIG. 1. The stabilizer 10 includes a lateral portion 11 extending along the width of the vehicle. Lateral portion 11 is received in a bushing 12 that is secured to a frame of the vehicle. The lateral portion 11 extends to a leg portion 13 which terminates in an end 14 that is secured to a suspension component. As the suspension component moves up and down during the operation of the vehicle, the stabilizer bar 10 absorbs some of the load from the suspension component by deforming the stabilizer bar. The stabilizer bar 10 is deformed by bending and torsional stresses. Typically, the leg portion 13 undergoes primarily bending stresses while the lateral portion 11 and the portion of the stabilizer connecting the lateral portion 11 and the leg portion 13 undergo torsional stresses.

Since the different cross-sectional areas of the stabilizer bar 10 undergo different stresses, it is more efficient to design the cross-sectional area of the stabilizer bar 10 to endure the maximum stress for that particular cross-sectional area. That is, it is not necessary to unnecessarily add material to a portion of the stabilizer bar that undergoes a lower stress than another area of the stabilizer bar 10. In particular, the leg portion 13 typically requires less material than the lateral portion 11 because the leg portion 13 undergoes lower stresses than the lateral portion 11. Previously, the leg portion 13 had a circular cross-section and the lateral portion 11 also had a circular cross-section, which was larger than the circular cross-section of the leg portion 13.

Figure 2:
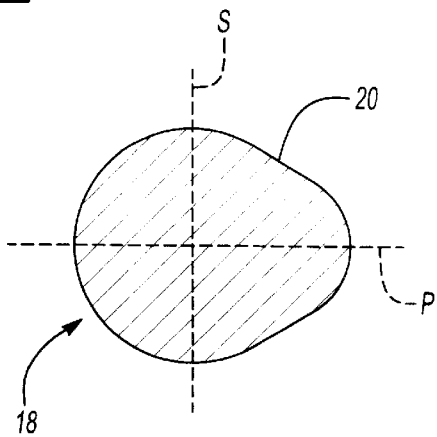
FIG. 2 is a cross-section of the stabilizer bar shown in FIG. 1 taken along line 2—2.

The stabilizer bar 10 of the present invention has a first cross-sectional area 16 and a second cross-sectional area 18. Preferably, the cross-sectional areas are different from one another to more efficiently accommodate the stresses experienced in the particular area of the stabilizer bar 10. Referring now to FIG. 2, the second cross-sectional area 18 includes a first non-circular surface 20. The surface 20 is egg-shaped and includes a primary load bearing direction P and a secondary load bearing direction S, which is transverse to the primary load bearing direction P. The second cross-sectional area 18 is able to endure a greater load in the primary load bearing direction P than the secondary load bearing direction S. As a result, it is desirable to arrange the second cross-sectional area 18 such that the primary load bearing direction P is generally aligned with the maximum bending load experienced in the cross-sectional area 18. By utilizing a non-circular shape, stabilizer bar material and weight may be reduced.

Figure 3:
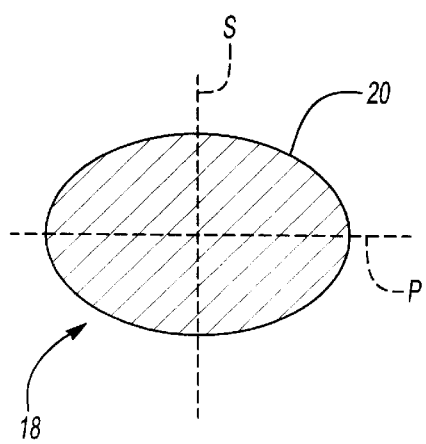
FIG. 3 is an alternative cross-sectional area of the present invention.

Other configurations of the cross-sectional areas may be used, as shown in FIGS. 3–6. The cross-sectional area shown in FIG. 3 is a solid bar having an elliptical shape. The wider portion of the cross-sectional area is capable of enduring a greater load than the narrower portion of the cross-sectional area. This elliptical cross-sectional area is particularly suitable for the leg portion 13 of the stabilizer bar 10. The primary load bearing direction P is preferably arranged generally vertically, which is the direction of movement of the suspension component.

Figure 4:
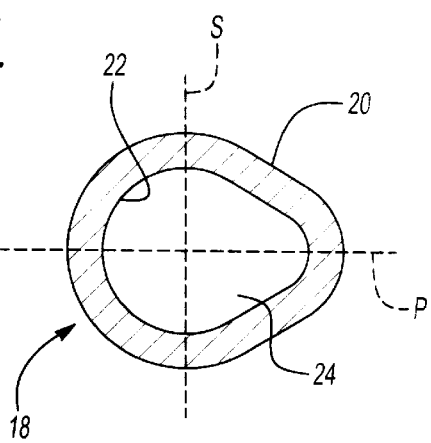
FIG. 4 is yet another cross-sectional area of the present invention.
Figure 5:
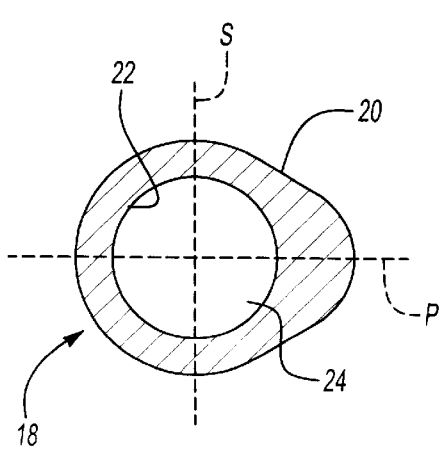
FIG. 5 is yet another cross-sectional area of the present invention.
Figure 6:
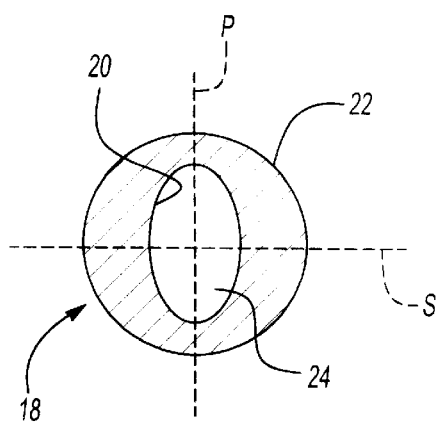
FIG. 6 is still another cross-sectional area of the present invention.

The stabilizer bar 10 may also be formed from a hollow bar which is defined by a first surface 20 and a second surface 22 which defines an inner cavity 24. The cross-sectional area may have a generally uniform wall thickness and may be egg-shaped, as shown in FIG. 4. Another possible configuration is utilizing an egg-shaped outer surface 20 and a circular inner surface 22, as shown in FIG. 5. Yet another suitable embodiment is shown in FIG. 6. The cross-sectional area includes a circular outer surface 22 and an elliptical inner surface 20.

The shapes of the surfaces and the wall thicknesses may be varied to adjust the load bearing capacity of the cross-sectional area in the direction needed. As a result, the material needed to form the stabilizer bar 10 may be reduced and the weight and cost reduced.

The stabilizer bar 10 may be formed using any suitable method such as extrusion, upset forging, swaging, and/or machining. Additionally, the stabilizer bar 10 may be cold or hot formed.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A stabilizer bar comprising:
   a first cross-sectional area;
   a second cross-sectional area different than said first cross-sectional area; and
   a first surface at least partially defining said second cross-sectional area, said first surface having a curved non-circular shape with primary and secondary load bearing directions for bearing different maximum loads in each of said directions.

2. The stabilizer bar according to claim 1, further including a second surface spaced from said first surface defining an inner cavity.

3. The stabilizer bar according to claim 2, wherein said second surface is circular.

4. The stabilizer bar according to claim 2, wherein said first and second surface define a generally uniform wall thickness.

5. The stabilizer bar according to claim 1, wherein said first surface is an outer surface.

6. The stabilizer bar according to claim 1, wherein said first surface is an inner surface.

7. A stabilizer bar comprising:
   a cross-sectional area; and
   a surface at least partially defining said cross-sectional area, said surface having a curved non-circular shape with primary and secondary load bearing directions for bearing different maximum loads in each of said directions.

8. The stabilizer bar according to claim 7, further including another surface spaced from said surface defining an inner cavity.

9. The stabilizer bar according to claim 8, wherein said first and second surface define a generally uniform wall thickness.

10. The stabilizer bar according to claim 7, wherein said surface is an outer surface.

11. The stabilizer bar according to claim 7, wherein said first surface is an inner surface.

12. A stabilizer bar comprising:
    a first cross-sectional area;
    a second cross-sectional area different than said first cross-sectional area; and
    an outer surface at least partially defining said second cross-sectional area, said outer surface having egg shape with primary and secondary load bearing directions for bearing different maximum loads in each of said directions.

13. A stabilizer bar comprising:
    a first cross-sectional area;
    a second cross-sectional area different than said first cross-sectional area; and
    an outer surface at least partially defining said second cross-sectional area, said outer surface having elliptical shape with primary and secondary load bearing directions for bearing different maximum loads in each of said directions.

14. A stabilizer bar comprising:
    a first cross-sectional area;
    a second cross-sectional area different than said first cross-sectional area; and
    a first surface at least partially defining said second cross-sectional area, said first surface having a non-circular shape with primary and secondary load bearing directions for bearing different maximum loads in each of said directions, and a second egg-shaped surface spaced from said first surface defining an inner cavity.

15. A stabilizer bar comprising:
    a first cross-sectional area;
    a second cross-sectional area different than said first cross-sectional area; and
    an inner surface at least partially defining said second cross-sectional area, said inner surface having an egg shape with primary and secondary load bearing directions for bearing different maximum loads in each of said directions.

16. A stabilizer bar comprising:
    a first cross-sectional area;
    a second cross-sectional area different than said first cross-sectional area; and
    an inner surface at least partially defining said second cross-sectional area, said inner surface having an elliptical shape with primary and secondary load bearing directions for bearing different maximum loads in each of said directions.

17. A stabilizer bar comprising:
    a cross-sectional area; and
    an outer surface at least partially defining said cross-sectional area, said outer surface having an egg shape with primary and secondary load bearing directions for bearing different maximum loads in each of said directions.

18. A stabilizer bar comprising:
    a cross-sectional area; and
    an outer surface at least partially defining said cross-sectional area, said outer surface having an elliptical shape with primary and secondary load bearing directions for bearing different maximum loads in each of said directions.

19. A stabilizer bar comprising:

a portion having a first cross-sectional area;

a second cross-sectional area extending along said portion from said first cross-sectional area, said second cross-sectional area different than said first cross-sectional area; and a first surface at least partially defining said second cross-sectional area, said first surface having a non-circular shape with primary and secondary load bearing directions for bearing different maximum loads in each of said directions.

20. A stabilizer bar comprising:

a first cross-sectional area;

a second cross-sectional area in continuity with and different than said first cross-sectional area; and a first surface at least partially defining said second cross-sectional area, said first surface having a non-circular shape with primary and secondary load bearing directions for bearing different maximum loads in each of said directions.

* * * * *